March 19, 1963 G. A. DOTTO ETAL 3,081,843
IMPROVEMENT IN CALIPER TYPE DISK BRAKES
Filed May 25, 1960 2 Sheets-Sheet 1
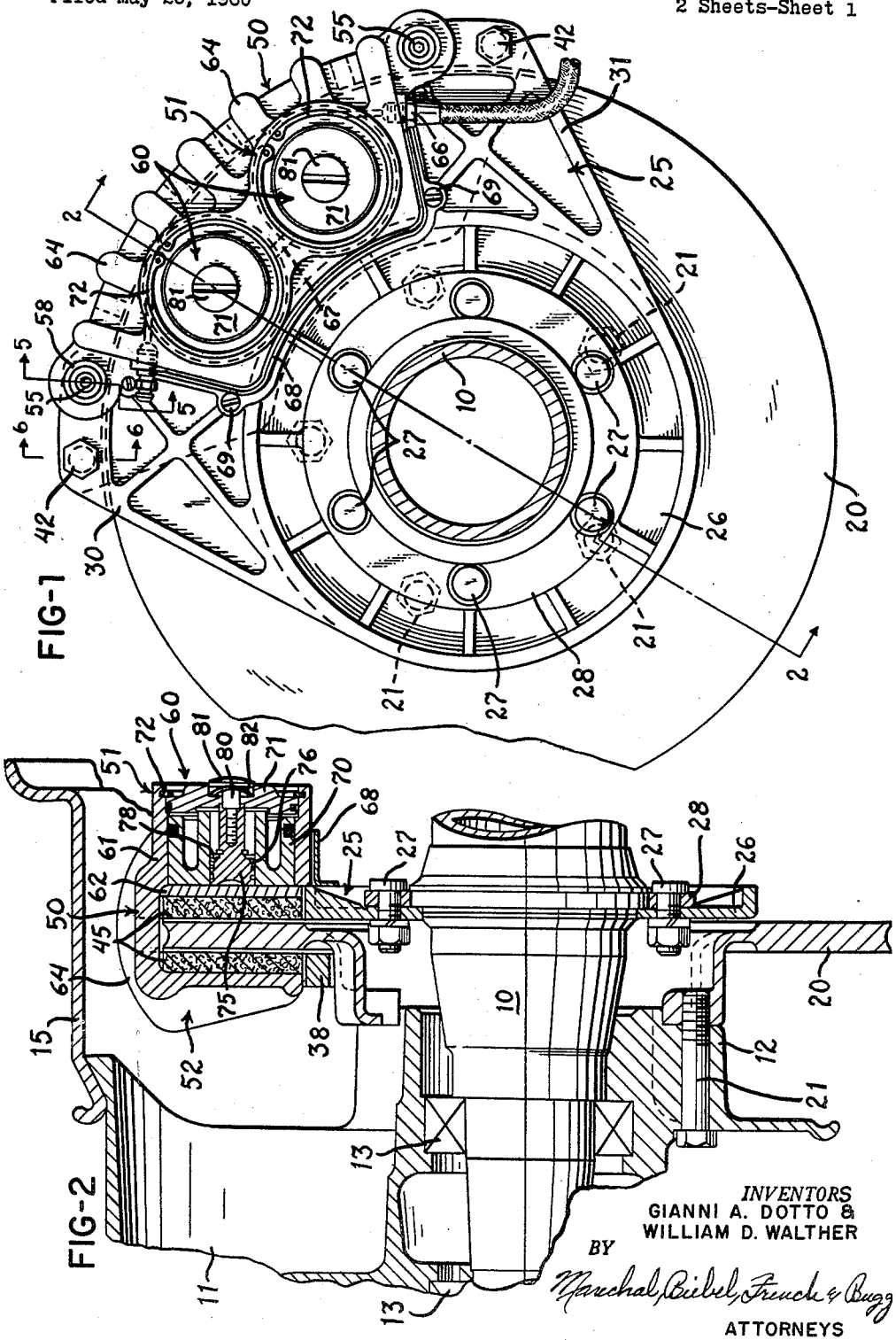
INVENTORS
GIANNI A. DOTTO &
WILLIAM D. WALTHER
BY
Marchal, Biebel, French & Bugg
ATTORNEYS March 19, 1963 G. A. DOTTO ETAL 3,081,843
IMPROVEMENT IN CALIPER TYPE DISK BRAKES
Filed May 25, 1960 2 Sheets-Sheet 2
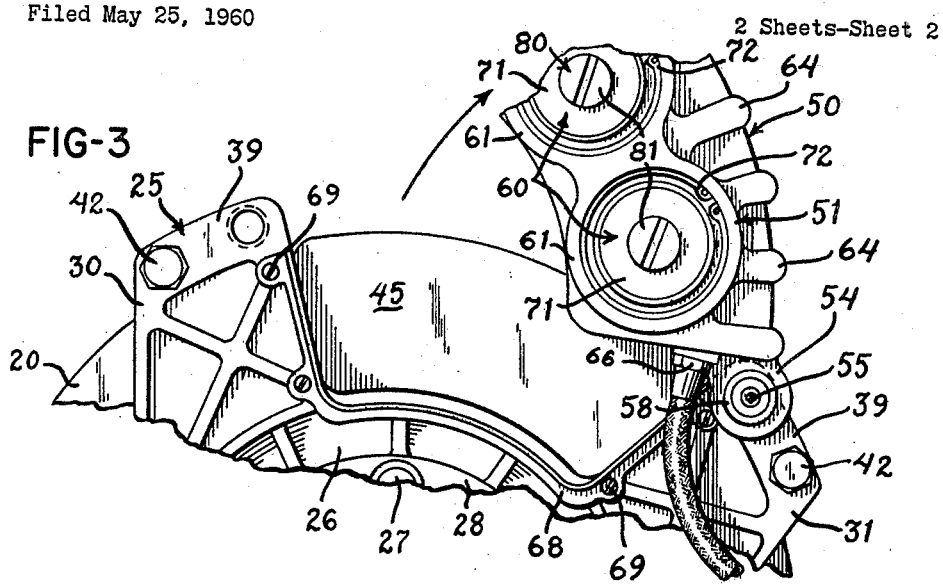
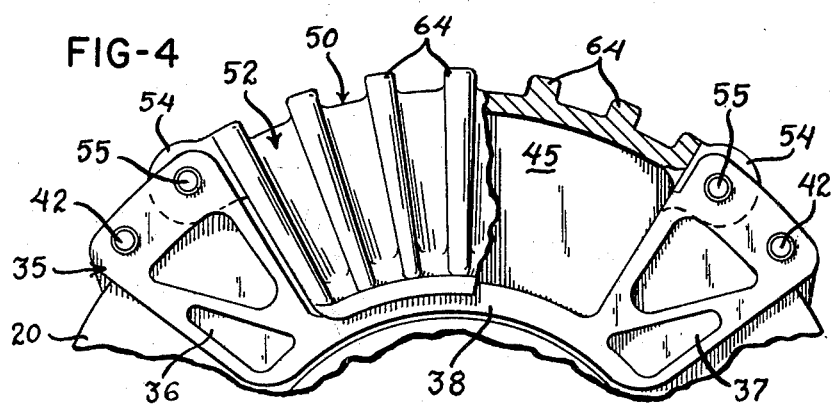
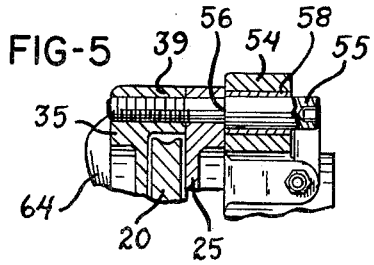
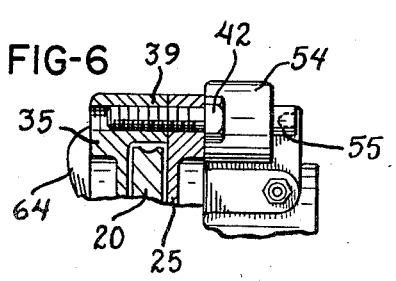
INVENTORS
GIANNI A. DOTTO &
WILLIAM D. WALTHER
BY
Marechal, Biebel, French & Bugg
ATTORNEYS United States Patent Office 3,081,843
Patented Mar. 19, 1963

3,081,843
IMPROVEMENT IN CALIPER TYPE DISK BRAKES
Gianni A. Dotto and William D. Walther, Dayton, Ohio, assignors to The Dayton Steel Foundry Company, Dayton, Ohio, a corporation of Ohio
Filed May 25, 1960, Ser. No. 31,678
8 Claims. (Cl. 188—73)

This invention pertains to disk brakes and more particularly to a caliper type disk brake.

This invention provides a disk brake including relatively fixed torque members positioned on opposite sides of a rotatable disk and arranged to receive pads of friction material adjacent a segment of the braking surfaces of the disk. The torque members have arms which provide for transverse movement of the friction pads and restrain such pads against rotational movement thereby absorbing all of the rotational torque during an application of the brake. The torque members are not required however to apply or absorb the forces associated with the application of braking pressures to the disk through the friction pads.

A clamp housing of the caliper type is mounted on the torque members for the purpose of retaining the pads within the arms formed by the torque members and for applying braking pressures to the pads. The clamp housing includes a pressure portion engageable with one of the pads and a reaction portion engageable with the opposite pad. The housing is carried on pilot bolts threaded into the reaction members for transverse aligning movement with respect to the disk and includes hydraulic brake piston and retraction units through which the braking force is applied to the pads of friction material.

The force applying hydraulic pistons are preferably arranged in one side of the clamp housing for the application of braking force directly to the adjacent pad. Since the housing is free to move adjacent the disk on the mounting bolts, equal force is simultaneously applied to the opposite pad through the reaction portion of the housing.

An advantage of this invention resides in the provision of the torque members which are arranged to carry only the rotational torque incident to the application of the brakes, and the weight of the clamp housing. Similarly, the clamp housing is designed expressly for the purpose of the application of hydraulic pressure and reaction forces, and carries none of the rotational torque. Also, since there is no connection between the hydraulic pistons and the adjacent pad of lining, no torque load is transmitted to the pistons and they are not subject to rocking and wear due to torque.

A further advantage of the arrangement of this invention resides in the ease by which the pads of friction material are replaceable, it being only necessary to remove a single clamp housing pilot bolt to swing the housing on an opposite bolt outwardly away from the disk, thus exposing the pads for inspection and drop-in replacement.

The arrangement of the parts of this invention utilize the maximum benefits from the dual piston brake retraction units such as are disclosed and claimed in the copending U.S. application of Dotto, Serial No. 859,172, filed December 14, 1959, and assigned to the same assignee as this invention.

It is therefore an object of this invention to provide a disk brake as outlined above having a torque member for angularly positioning pads of friction material and a clamp housing for applying braking force to such pads.

A further object of this invention is to provide a disk brake as outlined above having a self-aligning and centering clamp housing for the application of braking force to pads of friction material and which carries none of the rotational torque.

Another object of this invention is to provide a disk brake as outlined above having pads of friction material which are readily replaceable by the removal of a mounting bolt for pivotally swinging a clamp housing on torque members outwardly away from the disk to expose the pads of friction material for inspection and replacement.

Other objects and advantages of the invention will be apparent from the following description, the accompanying drawings and the appended claims.

In the drawings—

FIG. 1 is an elevation of a brake constructed according to the teachings of this invention;

FIG. 2 is a section taken generally along line 2—2 of FIG. 1;

FIG. 3 is a partial elevation of a portion of the brake of FIG. 1 showing the clamp housing in a pivoted position for access to the pads of friction material;

FIG. 4 is a partial elevation of the portion of the brake of FIG. 3 viewed from the opposite side with a portion of the clamp housing being broken away to expose the adjacent pad of friction material;

FIG. 5 is a section taken generally along line 5—5 of FIG. 1 showing the arrangement of the clamp housing on one of the pilot bolts; and FIG. 6 is a section along line 6—6 of FIG. 1 showing the connection of the torque members.

Referring to the drawings, which illustrate a preferred embodiment of the invention, a relatively fixed axle is shown at 10 upon which the brake of this invention is mounted. A wheel 11 including a flange 12 is rotatably mounted on the axle 10 on bearings 13 and may include a rim 15 for the support of a tire, not shown.

The brake includes a generally radially extending disk 20 mounted for rotation with the wheel 11 on the flange 12 and secured thereto by a plurality of machine bolts 21. The disk 20 may be formed of steel or cast iron as shown, or may be constructed according to the teachings of the copending U.S. application of Dotto and Walther, Serial No. 807,376, filed April 20, 1959, now Patent No. 3,013,636, granted December 19, 1961, and assigned to the same assignee as this invention.

The brake further includes torque members fixed adjacent each side of the disk 20 and including a front or outer torque member 25 with an internal mounting flange 26. The flange 26 is mounted by bolts 27 to a flange 28 welded to the axle 10. The torque member 25 is formed with a pair of radially extending torque arms 30 and 31 encompassing a segment of the disk 20 and extending slightly beyond the periphery of the disk.

A rear or inner torque member 35 (FIG. 4) is preferably formed separate from the member 25 and is mounted in fixed relation to the axle 10 on the outer torque member 25. The inner member 35 also includes a pair of radially extending torque arms 36 and 37 integrally joined by a web portion 38. The arms 36 and 37 are each formed with an offset boss 39 on the front surface thereof as shown in FIGS. 5 and 6 for mating with corresponding surfaces on the arms 30 and 31 of the torque member 25. The inner member 35 is held in the assembled position in fixed relation to the axle by a pair of machine bolts 42 threaded from the arms 30 and 31 of the member 25 into the bosses 39. As an alternating construction, the member 35 may be cast integrally with the outer member 25 in a single unit.

The arms of each of the torque members 25 and 35 provide arcuately shaped recesses or openings adjacent the disk 20 for receiving pads 45 of friction material. A pair of the pads 45 are thereby positioned one each adjacent each side of the disk 20 between the respective arms of the torque members. The torque member arms provide for transverse movement of the pads 45 into and out of frictional engagement with the adjacent surfaces of the disk 20, and restrain the pads 45 against rotational movement thereby absorbing the braking torque.

Means for retaining the pads 45 in position between the arms and for applying braking pressure simultaneously to each of the pads 45 includes a caliper or clamp housing 50. The housing 50 is adapted to be positioned over the segment of the disk 20 encompassed by the arms of the torque members and consists generally of a pressure portion 51 at one side of the disk 20 and a reaction portion 52 at the other side for engagement with the pads 45.

Means for mounting the housing 50 on the torque members providing for limited transverse, self-aligning movement thereof with respect to the disk 20 includes tabs or ears 54 one each formed at each end of the housing 50. The ears 54 are mounted on a pair of pilot bolts 55, one each threaded into the inner torque member 35 and extending through the outer torque member 25 as shown in FIG. 5. The bolts 55 are shouldered at 56 for engagement with the outer torque member to provide an additional means for securing the inner torque member to the outer member 25. The ears 54 are formed with a sleeve bushing 58 providing a bearing surface with the bolt 55 for the axial or transverse movement of the housing 50 on the torque members.

It will be seen in FIG. 3 that the removal of one of the pilot bolts 55 permits the housing 50 to be pivotally swung on the other bolt 55 outwardly clear of the disk 20, thus exposing each of the pads 45 of lining material for inspection or drop-in replacement. Also, no rotational force or torque is applied to the housing, and no braking force of the housing is applied to the torque members.

The housing 50 includes pressure responsive means in the form of a pair of piston retraction units 60 received in a pair of cylindrical housings 61 formed in the housing 50. The units 60 are operated by hydraulic pressure to apply braking force directly to the adjacent pad 45 through a steel pressure plate 62 and indirectly to the opposite pad 45 through the reaction portion 52 in contact with the pad. The housing 50 is ribbed as shown at 64 for the purpose of providing additional strength to resist the spreading apart of the housing portions 51 and 52, consistent with low weight.

The units 60 are preferably of the automatic adjusting retraction type more fully described in the above copending U.S. application of Dotto Serial No. 859,172, and one such unit is described here only in sufficient detail for an understanding of the operation of this invention. Hydraulic pressure for the simultaneous operation of the units 60 is applied through a common inlet fitting 66, communication being made between the units by a passageway 67 (FIG. 1). A generally U-shaped dust cover 68 is secured to the outer torque member 25 adjacent the housing 50 by screws 69 for the purpose of protecting the units 60 against the intrusion of dust and dirt.

The units 60 each include a primary piston 70 operable to apply braking force to the adjacent pad 45 through the pressure plate 62. The cylindrical housing 61 is closed by an end plate 71 held in place by a circular clip 72. A secondary piston 75 is positioned coaxially within the primary piston 70 and connected thereto through a drag seat consisting of a split ring 76 held on the secondary piston 75 in frictional engagement with the primary piston 70 by a spring washer 78.

A cap bolt 80 is threaded into the secondary piston 75 from outside the plate 71 and includes an enlarged head 81 positioned for movement adjacent the plate 71. A spring washer 82 is positioned between the head 81 and the plate 71 and establishes a normal retraction gap by means of which the primary piston is held normally retracted when no hydraulic pressure is applied.

The application of hydraulic pressure to the primary piston carries the pistons 70 and 75 toward the disk 20 to apply braking pressure thereto, against the resistance of the retraction spring 82. Wearing of the pads 45 and deflection of the housing 50 is compensated for by relative movement between the primary and secondary pistons through the drag seat.

The hydraulic force is thus applied directly to the adjacent pad through the pressure plate 62 and indirectly to the opposite pad by reason of the movement of the housing on the pilot bolts 55. The rotational torque applied by the disk 20 to the pads 45 is transmitted to the arms of the torque members 25 and 35 and does not affect the transverse, self-aligning movement of the clamp housing 50. Similarly, the application of hydraulic force by the units 60 within the housing is independent of such rotational torque, and the housing is free to align itself on the pilot bolts 55 throughout the life of the friction material.

It will be further be seen that the outer torque member 25 removes all torque forces from the pistons 70 which would otherwise be carried by the lining to one side of their cylinder walls and cause them to undergo frictional engagement and wear. This advantage is obtained by the provision of the single torque member 25. It is therefore within the scope of this invention to provide such a single torque member adjacent the hydraulic units, and to carry the opposite pad of lining in the housing 50. Such an arrangement would work to advantage to eliminate torque on the pistons 70.

It will also be seen that this invention provides a disk brake of rugged yet simple design characterized by ease of manufacture, installation and maintenance. The installation of new pads of lining material, or the inspection of the material, is readily accomplished by the removal of a single one of the pilot bolts 55 and swinging the housing 50 outwardly away from the disk 20 thus exposing each of the pads 45 for drop-in replacement.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A disk brake comprising a rotatable disk, a relatively fixed torque member having pad retaining means for supporting pads of friction material adjacent opposite sides of said disk for axial movement and preventing rotational movement thereof, a pad of friction material arranged on each side of said disk for axial movement on said pad retaining means into engagement with said disk and being restrained by said torque member against rotational movement, spaced apart pilot bolts fixed to said member and extending axially therefrom, a caliper housing mounted for generally axial movement on said bolts over said disk at said pads and having means operable to effect said axial movement of said pads into engagement with said disk, and said housing being pivotally movable on one of said bolts outwardly away from said disk to expose said pads for removal and replacement.

2. A disk brake comprising a rotatable disk, a relatively fixed torque member having pad retaining means for supporting pads of friction material adjacent opposite sides of said disk for axial movement and preventing rotational movement thereof, a pad of friction material arranged on each side of said disk for axial movement on said pad retaining means into engagement with said disk and being restrained by said member against rotational movement, a pair of spaced apart pilot bolts fixed to said member and extending axially therefrom on one side of said disk, a caliper housing mounted for self-aligning generally axial movement on said bolts over said disk at said pads to retain said pads in said openings and having pressure operated means operable directly against one of said pads and operable to effect said axial movement of said housing against said opposite pad to force said pads into engagement with said disk, and said housing being pivotally movable on one of said bolts upon the removal of the other of said bolts outwardly away from said disk to expose said pads for removal and replacement.

3. The brake of claim 2 wherein said pressure operated means includes a hydraulic piston free of rigid connection to said one pad leaving said piston free of the effects of torque on said pads.

4. A hydraulic disk brake for a wheel and axle, comprising a disk arranged for rotation with said wheel, an outer torque member fixed to a non-rotating component of said axle adjacent said disk and having portions extending radially beyond the periphery of said disk, a separate inner torque member fixed to said outer member at said portions, means in each said member defining openings adjacent said disk for receiving pads of friction material and providing for axial movement of said pads into engagement with said disks, a clamp housing positioned over said disk at said openings and having means operable to apply a braking force simultaneously to each of said pads to effect frictional engagement thereof against the adjacent sides of said disk, and means mounting said housing to said members for self-aligning movement in a generally axial sense with respect to said disk upon said application of braking force.

5. A hydraulic disk brake comprising a rotatable disk, torque members fixed adjacent each side thereof and each having a pair of extending torque arms encompassing a segment of said disk, pads of friction material received between said arms for generally axial movement into engagement with said disks and being restrained by said arms against rotational movement, a clamp housing positionable over said disk at said segment and having a pressure portion engageable with one of said pads and a reaction portion engageable with the other of said pads, means connecting said housing to said torque members providing for generally axial movement of said housing in relation to the rotational movement of said disk, and hydraulically operated means in said pressure portion of said housing operable to effect the simultaneous application of braking force on said pads through said pressure and reaction portions by said generally axial movement.

6. The brake of claim 5 wherein said hydraulic operating means includes a hydraulic piston free of rigid connection to said pads leaving said piston free of the effects of brake torque.

7. A hydraulic disk brake comprising a rotatable disk, a pair of torque members one each fixed relatively to said disk adjacent each side thereof and each having a pair of radially extending torque arms encompassing a segment of said disk, pads of friction material received between said arms for axial movement into engagement with said disks and being restrained by said arms against rotational movement, an integral clamp housing positionable over said disk at said segment and having a pressure portion engageable with one of said pads and a reaction portion engageable with the other of said pads, means connecting said housing to said torque members providing for limited self-aligning axial movement of said housing in relation to said disk, and hydraulically operated means in said housing operable to effect the application of braking force on said pads through said pressure and reaction portions.

8. A disk brake comprising a rotatable disk, a pair of torque members one fixed adjacent each side of said disk, means in said torque members defining openings adjacent said disk, a pad of friction material received within each said opening and movable through said torque members to contact opposite sides of said disk, housing means including a pressure portion positioned outwardly of one of said torque members on one side of said disk and a reaction portion positioned outwardly of the opposite torque member on the other side of said disk, means on one of said torque members supporting said housing means for self-aligning, generally axial movement, and a fluid pressure operated mechanism in said pressure portion of said housing means operable to effect direct application of force to the adjacent pad and indirect application of force to the opposite pad through said reaction portion by said self-aligning movement of said housing means on said supporting means.

References Cited in the file of this patent

UNITED STATES PATENTS

| | | |
|---|---|---|
| 2,862,581 | Lucien | Dec. 2, 1958 |
| 2,915,147 | Davis | Dec. 1, 1959 |
| 3,035,664 | Desvignes et al. | May 22, 1962 |

FOREIGN PATENTS

| | | |
|---|---|---|
| 1,180,633 | France | Jan. 5, 1959 |
| 1,227,386 | France | Mar. 7, 1960 |
| 714,962 | Great Britain | Sept. 8, 1954 |
| 536,488 | Italy | Dec. 2, 1955 |